April 1, 1952    J. O. PARR, JR    2,591,192
SEISMIC SURVEYING
Filed Nov. 29, 1949    2 SHEETS—SHEET 1
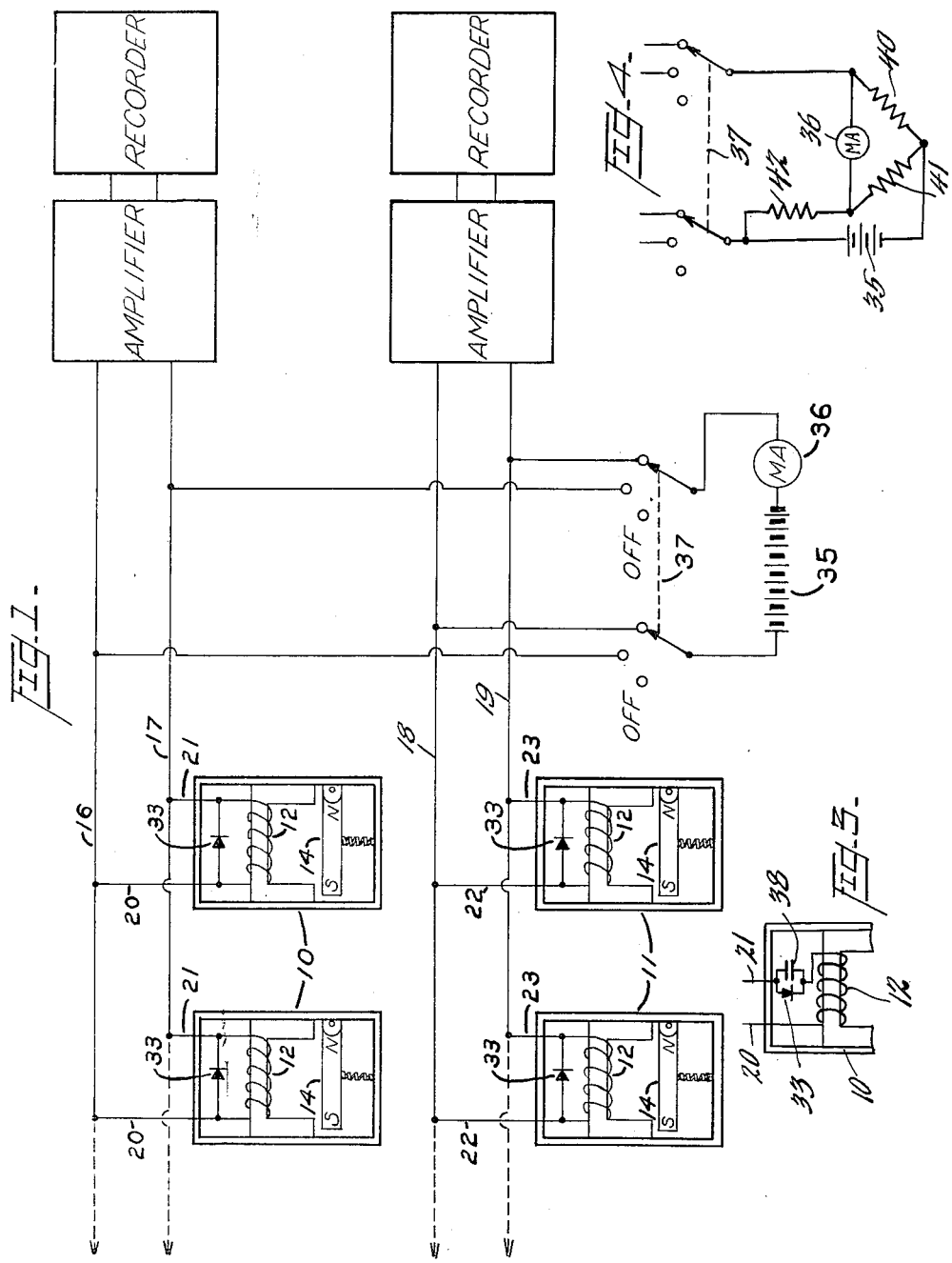
INVENTOR
Josephus O. Parr, Jr.
BY Watson, Cole, Grindle & Watson
ATTORNEYS

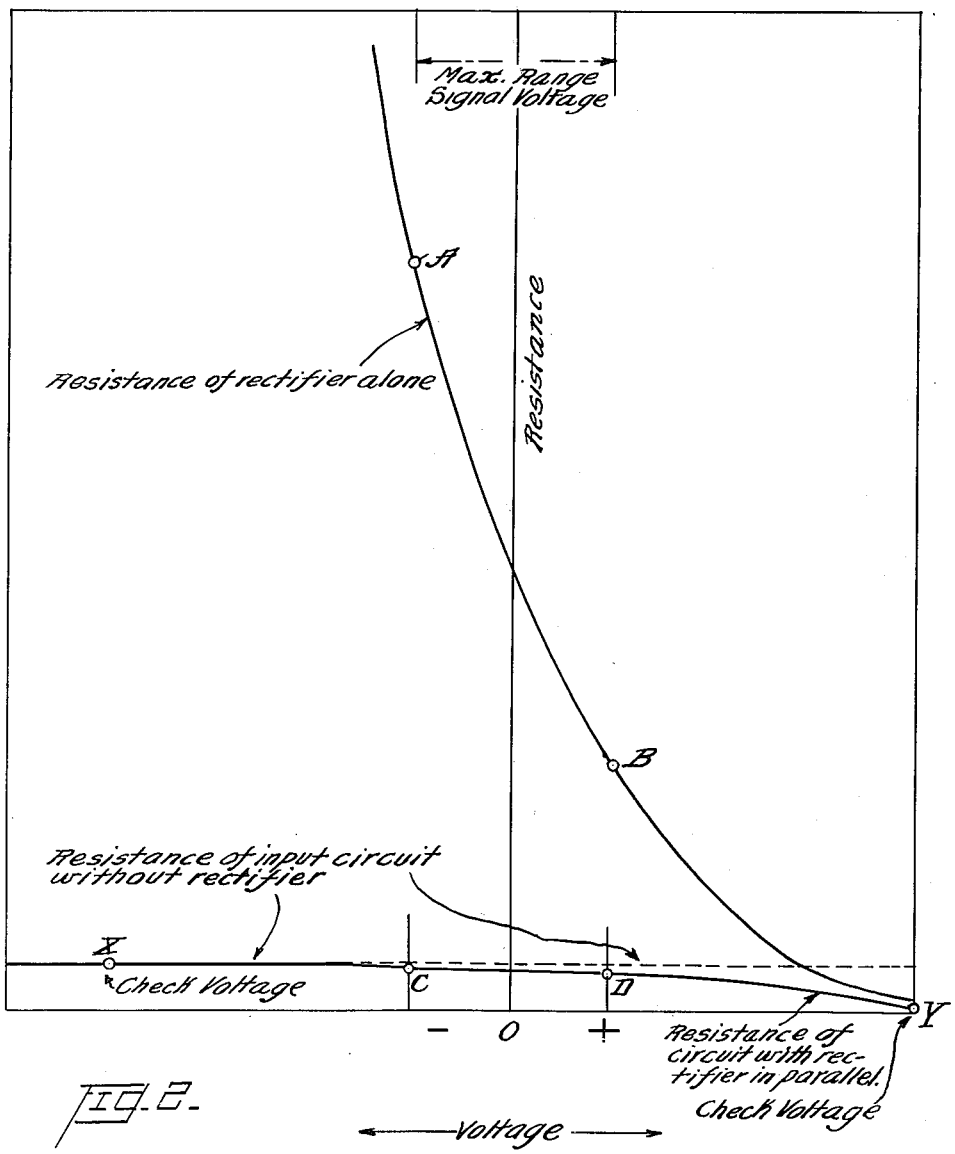

UNITED STATES PATENT OFFICE 2,591,192

SEISMIC SURVEYING

Josephus O. Parr, Jr., San Antonio, Tex., assignor to Olive S. Petty, San Antonio, Tex.

Application November 29, 1949, Serial No. 129,895

4 Claims. (Cl. 177—352)

This invention relates to measuring apparatus, and is especially concerned with apparatus for use in seismic surveying.

In conducting geological surveys by the seismic method, seismic waves are propagated in the earth, for example by detonating a charge of explosive at a selected point, called the shot point. Seismometers or detectors, responsive to the vibrations so propagated, and capable of converting the energy of vibration into electrical wave form signal energy, are located at some distance from the shot point on or just beneath the surface. A plurality of seismometers is ordinarily employed, suitably spaced so that the refracted or reflected wave energy arrives at the several detecting points at different times, and the output of each seismometer, or of each group of seismometers, is transmitted by means of a conducting line to a remote station at which the signal energy is suitably amplified and recorded, the connections to the conducting line being made when the detecting instrument is positioned.

It is important that each seismometer be so connected to its conducting line or transmission that the earth vibrations from the several detecting points will be received at the remote station in the correct phase, and it is necessary that the operator at the recording station be informed in the event any seismometer is improperly connected to the conducting line, either by reason of reversal of the output leads of the seismometer, or by failure to make proper contact between these leads and the conducting line. It is the principal objects of the present invention to provide means whereby such improper connections may be determined at the recording station.

More specifically, the present invention contemplates the association with the output circuit of each seismometer of a device having a resistance characteristic which varies with the applied voltage, for instance a rectifier. Preferably the device is so selected that within the range of voltages developed by the seismometer, the variation in resistance of the device is so small that no adverse effect is produced on the record during the normal use of the seismometer. However, when a voltage substantially higher than this usual range of voltages is applied to the output circuit of the seismometer, for instance by the application of a D. C. source of voltage across the conducting line at the recording station, any reversal or faulty connection of the seismometer leads may be indicated on a suitable instrument at the recording station, for example, a milliammeter, and the faulty connection corrected before a record is made.

Further objects and features of the invention will be apparent from the following description taken in connection with the accompanying drawings, in which:

Figure 1 is a wiring diagram of seismic surveying apparatus to which the invention has been applied;

Figure 2 is a graph showing certain characteristics of a circuit of the type illustrated in Figure 1; and Figures 3 and 4 illustrate modifications of details shown in Figure 1.

In order to facilitate an understanding of the invention, one embodiment thereof is illustrated, and specific language is employed to describe the same. It will nevertheless be understood that no limitation of the invention is thereby intended, such alterations and further modifications being contemplated as would normally occur to one skilled in the art to which the invention relates.

Referring now to Figure 1 of the drawings, it will be observed that two groups of seismometers, 10 and 11, are illustrated, the seismometers of each group being connected to the same conducting line. Each of the seismometers is represented diagrammatically as of the magnet type, having an output winding 12. Wave form electrical energy, representative of the vibratory displacement to which the seismometer is subjected, is induced in the winding by variation in magnetic flux occasioned by the displacement with respect to the seismometer casing of a steady mass 14, yieldably suspended in the casing. The details of the seismometer form no part of the present invention. If a magnetic seismometer be employed, the construction may be that shown in the patent to Petty 2,348,225, granted May 9, 1944. If a capacitative seismometer is employed, it may be constructed as suggested in the patent to Petty 2,357,356, granted September 5, 1944. Regardless of the type of seismometer employed, it may be provided with an output circuit and associated leads for connection to a conducting line or cable, whereby the electrical output of the seismometer may be transmitted to the amplifying and recording station.

Thus the leads 20 and 21 of the seismometers 10 of the first group are connected to the conductors 16, 17 of a transmission line, and the leads 22 and 23 of the seismometers 11 of the second group are connected to conductors 18 and 19 of a second transmission line. Separate amplifying and recording devices, located at the recording station, are energized from each of the conducting lines of the system.

It is common practice to combine the output of several seismometers of a group, for example to minimize stray energy as explained more fully in the patent to Welty 2,291,779, granted August 4, 1942, and the invention is illustrated with reference to such a system. It will nevertheless be appreciated that the advantages of the invention may be realized in any other arrangement of seismometers, for instance in a system in which the output of each seismometer is separately amplified and recorded, only one seismometer being connected to each conducting or transmission line. Other variations may be effected in the circuit thus far described, which is conventional, and the details thereof form no part of the present invention.

Associated with the output circuit of each seismometer, for instance in shunt with the output winding 12 thereof, is a rectifier 33. This rectifier may be of any conventional type, for example, a copper oxide or selenium rectifier, but is preferably one offering a resistance which is relatively high as compared with the resistance of the winding 12, so that the total resistance of the output circuit of the seismometer does not vary materially over the usual range of voltages developed by the seismometer in operation.

In Figure 3 is illustrated a modified arrangement in which the rectifier 33 is in series with the output winding 12, the rectifier being arranged in shunt with a condensor 38 to reduce the impedance offered to oscillatory energy.

At the recording station, a source of voltage 35 and an indicating instrument, for instance a milliammeter 36, are arranged in series for selective connection across each of the conducting lines 16, 17 and 18, 19, the switch 37 having an additional position in which the source and indicating instrument are disconnected from the seismic system during normal operation of the latter. Thus, in order to check the connections of the several seismometers to each of the conducting or transmission lines, the operator at the recording station may connect the voltage source and instruments across the line to be checked. Faulty or improper connection is then indicated by the instrument reading. If desired, a bridge circuit comprising resistors 40, 41, and 42 may be employed as shown in Figure 4, whereby the milliammeter 36 may be arranged in shunt.

Referring now to Figure 2, in which resistance of the seismometer circuit elements is plotted against voltage, it will be observed from the curve which represents the resistance of the rectifier that when the voltage developed by the seismometer varies over its normal range from a minimum to a maximum, the resistance of the rectifier varies correspondingly from A to B. The resistance of the input circuit, including the rectifier, varies during normal operation of the seismometer from C to D, the horizontal dotted line representing the resistance of the input circuit without the rectifier.

It will be appreciated that the variation in resistance of the circuit need not alter materially over the normal range of operating voltages by reason of the inclusion of the rectifier, the minimum resistance exhibited by the rectifier alone over this range being relatively high, as represented by the distance between the point B and the dotted line.

However, when a substantially higher voltage is applied to the input circuit, for example the voltage of source 35, the resistance of the circuit, indicated at Y, differs substantially from the resistance of the circuit exclusive of the rectifier, and from the resistance of the circuit when the connections from the seismometer to the conducting line are reversed, the value of the latter resistance being indicated by the point X. The meter 36 will thus indicate any reversal of polarity of the seismometer or seismometers, or a loose connection thereof with the conducting line, selection of the line to be tested having been first effected by manipulation of the switch 37 at the recording station.

To state the mode of operation otherwise, since the vertical distance between C and D is made negligible, the effect of the rectifier on the signal delivered by the detector is negligible. Since the vertical distance between X and Y is appreciable, the readings of the check meter will tell the operator whether the detector (or pair or group of detectors at a detecting station) are properly connected. The polarity of the voltage is determined by the polarity of the connection. If the connection be proper, the resistance to the check voltage, which is several times the maximum signal voltage, will have approximately unit value, as shown at the point X. If the connection be improper, the resistance to the check voltage will be considerably lower, as shown at the point Y. The information which the operator uses is the difference in magnitude rather than the polarity of the voltage. If he finds the connection to be improper he has it corrected before taking the shot.

The values represented in Figure 2 are merely relative, and may vary widely in the practice of the invention; the curves shown in this figure are merely illustrative of one form of circuit and variable resistance device.

The term "rectifier" is employed for convenience herein to designate any conducting device in which the resistance to current flow varies substantially at different voltages, and more especially to devices offering substantially higher resistance to current flow in one direction than in the other direction.

It will be appreciated that the system illustrated in the drawings may be extended to enable the operator to check the connections between a seismometer or group of seismometers to any number of conducting lines, it being necessary only to supply additional switch points for connecting the additional lines to the indicating instrument. Broadly speaking, the invention contemplates the use, in combination with the individual detectors, of any equivalent device whereby the characteristics of the circuit are so altered in the event of faulty or improper connection of the seismometer to the conducting line as to give an indication of the fault at the recording station.

Having thus described the invention, what is claimed as new and desired to be secured by Letters Patent is:

1. In apparatus for use in seismic surveying including at least one seismometer, amplifying and recording devices at a remote station, and a conducting line connecting said seismometer with said devices, the combination with a rectifier in the output circuit of the seismometer, of a voltage source and a current responsive indicating device in circuit at said station, and means at said station for connecting said conducting line to said source and indicating device, whereby faulty connections between said seismometer and said conducting line may be determined at said remote station, the voltage applied to said circuit by said source being substantially greater than the maximum seismometer output signal voltage.

2. In apparatus for use in seismic surveying including at least one seismometer, amplifying and recording devices at a remote station, and a conducting line connecting said seismometer with said devices, the combination with a rectifier in the output circuit of the seismometer, of a voltage source and a current responsive indicating device in circuit at said station, and a switch at said station for connecting said conducting line to said source and indicating device, whereby faulty connections between said seismometer and said conducting line may be determined at said remote station, the voltage applied to said circuit by said source being substantially greater than the maximum seismometer output signal voltage.

3. In apparatus for use in seismic surveying including at least one seismometer, amplifying and recording devices at a remote station, and a conducting line connecting said seismometer with said devices, the combination with a rectifier in the output circuit of the seismometer, of a voltage source and a current responsive indicating device in circuit at said station, and a switch at said station for connecting said conducting line to said source and indicating device, whereby faulty connections between said seismometer and said conducting line may be determined at said remote station, the resistance of said rectifier being high as compared to the resistance of said output circuit over the normal range of voltages developed by said seismometer, the voltage applied to said circuit by said source being substantially greater than the maximum seismometer output signal voltage.

4. In apparatus for use in seismic surveying including at least one seismometer, amplifying and recording devices at a remote station, and a conducting line connecting said seismometer with said devices, the combination with a rectifier in the output circuit of the seismometer, of a voltage source and a current responsive indicating device in circuit at said station, the voltage of said source being substantially greater than the maximum voltage normally developed in said output circuit by said seismometer, and means at said station for connecting said conducting line to said source and indicating device, whereby faulty connections between said seismometer and said conducting line may be determined at said remote station.

JOSEPHUS O. PARR, Jr.

REFERENCES CITED

The following references are of record in the file of this patent:

UNITED STATES PATENTS

| Number | Name | Date |
|---|---|---|
| 826,090 | Doran | July 17, 1906 |
| 2,052,057 | Reid | Aug. 25, 1936 |
| 2,423,970 | Gardner | July 15, 1947 |
| 2,465,696 | Paslay | Mar. 29, 1949 |